United States Patent [19]

Stephenson

[11] 3,895,823
[45] July 22, 1975

[54] VEHICLE PASSENGER SAFETY ASSEMBLY
[75] Inventor: Robert L. Stephenson, Sterling Heights, Mich.
[73] Assignee: Allied Chemical Corporation, New York, N.Y.
[22] Filed: Nov. 20, 1973
[21] Appl. No.: 417,657

Related U.S. Application Data
[63] Continuation of Ser. No. 132,700, April 9, 1971, abandoned.

[52] U.S. Cl. ............ 280/150 AB; 74/492; 224/29 E; 280/87 R; 280/150 B
[51] Int. Cl. ............................................. B60r 21/08
[58] Field of Search ........ 280/150 AB, 150 B, 87 R; 74/492

[56] References Cited
UNITED STATES PATENTS

| | | | |
|---|---|---|---|
| 3,167,974 | 2/1965 | Wilfert | 74/492 |
| 3,532,360 | 10/1970 | Leising et al. | 280/150 AB |
| 3,539,200 | 11/1970 | Chute | 280/150 AB |
| 3,540,304 | 11/1970 | Weiss | 74/492 |
| 3,618,976 | 11/1971 | Leising et al. | 280/150 AB |
| 3,625,543 | 12/1971 | Wolff | 280/150 AB |
| 3,674,059 | 7/1972 | Stephenson | 280/150 AB |
| 3,674,284 | 7/1972 | Lohr | 280/150 AB |

FOREIGN PATENTS OR APPLICATIONS
1,292,825  3/1962  France ........................... 280/150 B Primary Examiner—David Schonberg
Assistant Examiner—John P. Silverstrim
Attorney, Agent, or Firm—Ernest D. Buff; Jonathan Plaut

[57] ABSTRACT

A vehicle passenger safety assembly for restraining the driver of a vehicle in the event of a collision of said vehicle. The assembly, connected to the steering wheel of the vehicle, includes an inflatable gas bag which is stored in a folded, non-inflated condition in communication with a gas generating means. The gas generating means comprises a combustible material ignited upon impact or collision of the vehicle to generate a large volume of gas. The generated gas flows into a manifold means, in communication with the inflatable bag. The bag is thereby inflated to restrain the driver against his seat.

7 Claims, 3 Drawing Figures

PATENTED JUL 22 1975 3,895,823

SHEET 1

INVENTOR
ROBERT L. STEPHENSON
BY
Marvin Bressler
ATTORNEY

VEHICLE PASSENGER SAFETY ASSEMBLY

This is a continuation of application Ser. No. 132,700, filed Apr. 9, 1971, now abandoned.

BACKGROUND OF THE DISCLOSURE

The instant invention is directed to a vehicle passenger safety assembly. More specifically, the instant invention is directed to an assembly which restrains movement of the driver of a vehicle in the event of an impact or collision. Most specifically, the instant invention is directed to an inflatable gas bag assembly connected to the steering wheel of the vehicle to restrain the driver of a vehicle in the event of an impact or collision of the vehicle.

A great deal of research effort has been expended to develop passive vehicle safety assemblies wherein the occupants of the vehicle perform no voluntary act and yet are protected against injury in the event of an impact or collision of the vehicle in which they are driving. In one preferred type of passive assembly inflatable bags are automatically inflated in response to an impact or collision of the vehicle to restrain occupants of the vehicle.

A vehicle safety assembly of the type described above, has presented problems when designed to restrain the driver of the vehicle. In order to restrain the driver the assembly must be disposed on the steering column or steering wheel of the vehicle. This is because positioning of the assembly in any other location would result in the steering wheel and column being obstacles to the inflation of the bag. In the prior art, various systems have been developed wherein the inflatable bag is disposed on the column or wheel of the vehicle.

The prior art assemblies which are mounted on the wheel of the vehicle are heavy and bulky resulting in decreased steering efficiency. This defect manifests itself in poor wheel return after turning of the vehicle. Moreover, the bulkiness of these prior art designs often interferes with the driver's ability to reach various instruments on the dashboard.

Disposition of an assembly on the steering column in the prior art usually includes the defect of interference with the movement of the driver's legs, thus, endangering the driver's ability to fully control the vehicle.

In addition to the defects mentioned above, the bulkiness of the steering wheel and steering column designs of the prior art reduced the esthetic design of the vehicle passenger compartment.

SUMMARY OF THE INVENTION

The instant invention is directed to an apparatus which can be fastened to a conventional steering wheel without adversely affecting the steering characteristics of the vehicle nor the esthetic appearance of the passenger compartment. The unique apparatus of the instant invention thereby overcomes the disadvantages of prior art inflatable gas bag assemblies connected to vehicle steering wheels. Moreover, it eliminates the bulkiness and space robbing characteristics associated with inflatable gas bag assemblies mounted on the steering column of the vehicle.

In accordance with the instant invention a vehicle safety assembly is provided, connected to the steering wheel of the vehicle in which it is disposed. The assembly includes a pyrotechnic gas generating means. It should be appreciated that a pyrotechnic gas generating means is one in which all the gas generated results from the combustion of a combustible material contained within the generating means. The assembly further includes a manifold means which is in communication with the gas generator means. The diffuser means is preferably connected to the gas generator means as well. An inflatable bag is disposed about and in communication with the manifold means. The assembly is connected to the steering wheel by connecting means which attach the assembly to the steering wheel.

BRIEF DESCRIPTION OF THE DRAWINGS

The instant invention may be better understood by reference to the accompanying drawings of which.

DETAILED DESCRIPTION

Figure 1:
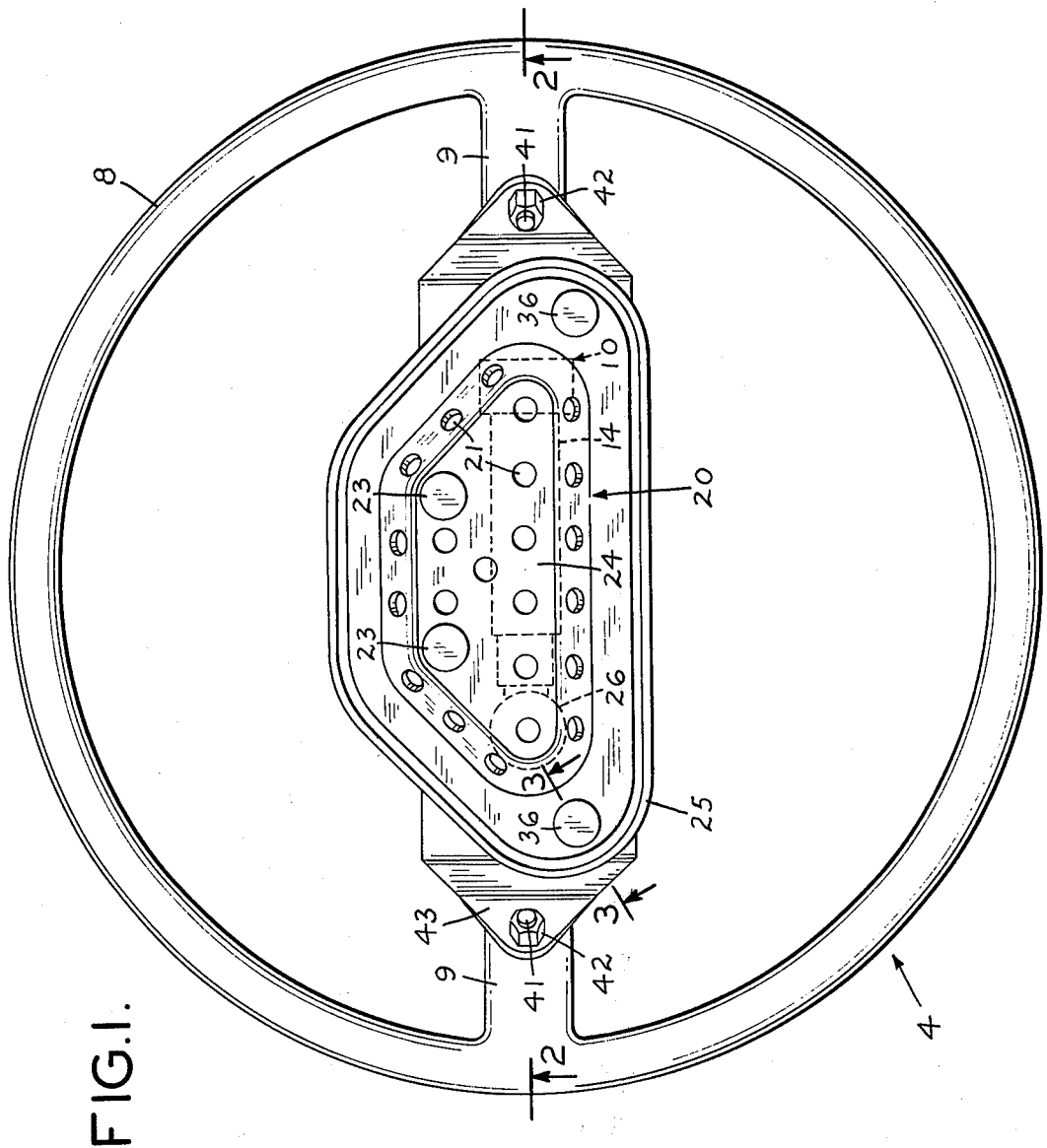
FIG. 1 is a view of the assembly of the instant invention shown connected to a steering wheel.
Figure 3:
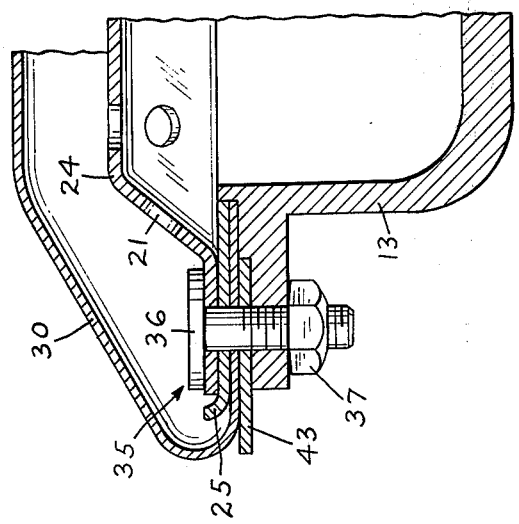
FIG. 3 is a fragmentary sectional view taken along line 3—3 of FIG. 1.

A vehicle safety assembly, generally indicated at 2, is connected to a steering wheel assembly, generally indicated at 4, of the vehicle in which it is disposed. The steering wheel assembly 4 is conventional. It comprises a hub 6 in communication with a steering column 45, an outer ring 8 and a plurality of spokes 9 connecting the hub 6 to the outer ring 8. The only modification made to a conventional steering wheel assembly in assembly 4 is a single hole 3 drilled into each of the spokes 9. These holes 3 will be explained below.

The vehicle safety assembly 2 comprises a gas generating means generally indicated at 10. The generating means 10 is of the pyrotechnic type, that is, all the gas used to inflate an inflatable gas bag is provided by the product of combustion of a combustible material. It includes an ignition means 11, which in a preferred embodiment is provided as part of an ignition means plug 12. The ignition means 11, in a preferred embodiment, comprises a squib or other high energy initiator. The threaded plug 12 permits replacability, in that the plug 12 is threaded to mate with a tapped portion 18 of the housing 13 of the gas generating means 10.

The housing 13 encloses a combustible material 14 disposed within a combustion compartment 55. The compartment 55 is located downstream of the ignition means 11. In addition, the housing 13 encloses a gas generating outlet means, generally indicated at 50, disposed downstream of the combustion compartment 55. The outlet means 50 is provided with means responsive to the pressure in the combustion compartment 55 in order to regulate the pressure level of the gas which inflates a gas bag 30, as will be explained below. The gas generating outlet means 50 includes a diffuser 15 provided with a plurality of openings 51. The diffuser 15 communicates with a conduit 16 which directs the generated gas, as will be described in greater detail hereinafter, against a rupture disc 17. The gas generating outlet means 50, in a preferred embodiment, is a threaded plug 57 to again provide replaceability. The housing 13, thus, is provided with a second tapped portion 19 to accommodate the plug 57.

Figure 2:
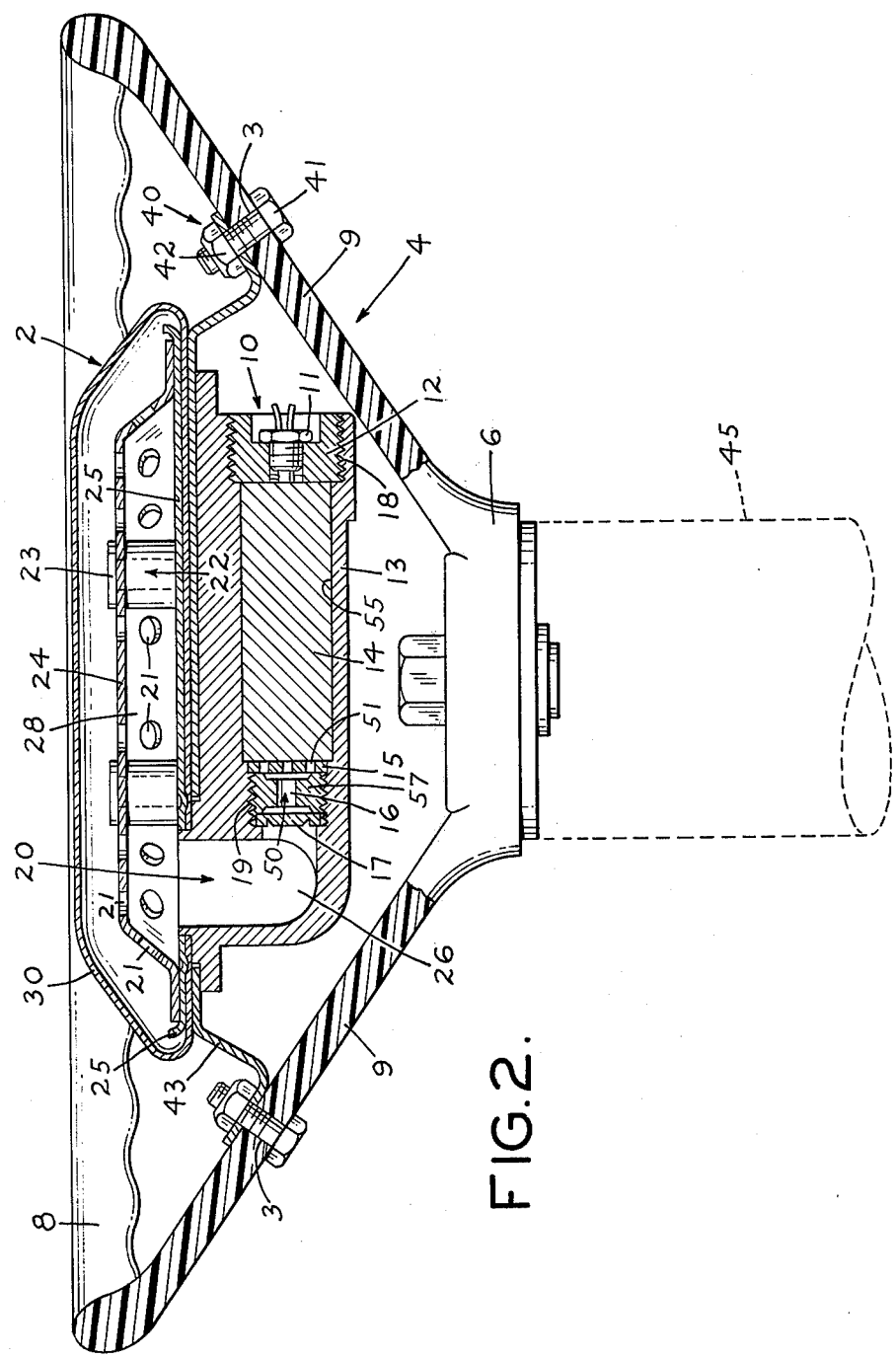
FIG. 2 is a sectional view of the assembly taken along line 2—2 of FIG. 1.

A manifold means, generally indicated at 20, is in communication with the gas generating means 10. In a preferred embodiment, the manifold means 20 includes an L shaped conduit 26 disposed downstream of the gas generating outlet means 50. In a preferred embodiment, the conduit 26 is disposed normally to both the remaining portion of the manifold means 20 and the gas generating means 10. The conduit 26, thus, serves to communicate with the remaining portion of the manifold means 20, which is generally above the gas generating means 10. The remaining portion of the manifold means 20 includes a diffuser 28, disposed above and parallel to the gas generator means 10. The diffuser 28 is defined by an outer housing 24 and an inner housing 25. The two housing sections 24 and 25 are separated by at least one spacer 22. In a preferred embodiment, a plurality of spacers 22 are provided. Each spacer 22 is held by a fastener 23. The fasteners 23 serve, in addition, as fastening means to fasten the inner and outer housing members, 25 and 24 respectively, together. In the embodiment illustrated in FIG. 2, the fasteners 23 are screws. The housing member 24 communicates with the gas bag 30 by means of a plurality of openings 21 disposed throughout the housing member 24.

The gas bag 30 is situated around the manifold means 20 and in communication with it, as described above. The inflatable gas bag 30 is stored in a folded, non-inflated condition. A bag retainer 43 is situated under the outer edges of the bag 30 to conveniently retain the non-inflated gas bag 30 within the assembly 2. The bag retainer 43 has a plurality of arms which serve an additional purpose which will be described presently.

The assembly 2 also includes connecting means. The connecting means encompass a first fastening means, generally indicated at 35, connecting the assembly 2 together. That is, the first fastening means 35 attaches the gas generating means 10, the manifold means 20 and the inflatable gas bag 30 together. The first fastening means 35 includes, in a preferred embodiment, a threaded screw 36 and a mating locking nut 37, which fastens together the upper and lower housing 24 and 25 respectively, the ends of the gas bag 30 disposed below said housings, the bag retainer 43 situated beneath the gas bag 30, and the housing 13 of the gas generator means 10. Each of these components is provided with a hole to accommodate the screw 36. A plurality of these first fastening means 35 are provided around the circumferential perimeter of the assembly 2.

The connecting means also includes a second fastening means 40. The fastening means 40 connects the steering wheel assembly 4 to the safety assembly 2. The second fastening means 40 is comprised of the plurality of connectors connecting each arm of the bag retainer 43 with each of the spokes 9 of the steering wheel assembly 4. In a preferred embodiment, each of the fastening means 40 comprises a hexagonal bolt 41 disposed through each of the holes 3 provided in each spoke 9 of the steering wheel assembly 4. The bolt 41 fastens the arms of the bag retainer 43 to the spoke 9. The arms of the retainer 43 are held fast by means of a locking nut 42 tapped to mate with the thread of the bolt 41. In a preferred embodiment, there are as many fastening means 40 as there are spokes 9.

In operation, the ignition means 11 is activated upon impact or collision of the vehicle in which the assembly 2 is disposed. A sensor (not shown) initiates a signal which is transmitted to the ignition means 11. The ignition means 11 ignites the combustible material 14. The material 14 is thereby burned in the combustion compartment 55 with the resultant production of a large volume of product gas. The product gas fills the combustion compartment 55 and flows through the openings 51 of the diffuser 15. The gas stream is directed from the diffuser 15, by way of conduit 16, to the inside wall of the disc 17.

As stated above, the gas generator outlet means 50 is provided with pressure sensitive means, responsive to the pressure in the combustion compartment 55, to regulate the pressure level of the generated gas which flows downstream into the manifold means 20. In one preferred embodiment, illustrated in FIG. 2, the disc 17 is predesigned to rupture at a predesigned pressure loading. Upon generation of sufficient pressure the disc ruptures with the resultant flow of gas at a predesigned pressure into the conduit 26.

In a second preferred embodiment, the disc 17 is ruptured by one or more explosive charges responsive to the same signal that initiates the combustion of the combustible material 14. The transmission of this signal to the explosive charge is preset to occur at a predetermined pressure loading in the combustion compartment 55. Thus, the flow of gas into the conduit 26 is a function of the pressure in the combustion chamber 55.

The inflating gas in compartment 55, upon rupture of the disc 17, flows downstream into the conduit 26, and, thereafter, into the diffuser 28. The gas escapes out of the diffuser 28, through the plurality of openings 21, into the folded, non-inflated gas bag 30. The gas bag 30 rapidly inflates and expands inside the circle formed by the outer ring 8 of the steering wheel assembly 4. The inflated gas bag 30 pushes against the driver, who is forced against the back rest section of his seat.

The above-described preferred embodiment of the instant invention is meant to be illustrative only. The scope and spirit of the instant invention will make apparent other embodiments, in addition to the one described above, which are within the scope of the instant invention. The instant invention should, therefore, be limited only by the appended claims.

What is claimed is:

1. A safety assembly, disposed in a vehicle, comprising:
    a pyrotechnic gas generator means as sole source of inflating gas, said gas generator means being located centrally of the steering wheel of said vehicle and spaced upwardly from the hub thereof;
    a manifold means connected to and in communication with said gas generator means;
    an inflatable gas bag connected about and in communication with said manifold means; and
    connecting means to connect said generator means, said manifold means and said inflatable gas bag together and solely to the spokes of the steering wheel of said vehicle.

2. An assembly in accordance with claim 1, wherein said manifold means comprises:
    a diffuser disposed parallel to said gas generating means; and
    a conduit normal to and in communication with said diffuser and said gas generating means.

3. A safety assembly disposed in a vehicle, comprising: a pyrotechnic gas generator means as sole source of inflating gas;
    a manifold means connected about and in communication with said gas generator means, said manifold means including a diffuser disposed above and parallel to said gas generator means and communicating therewith through a conduit;

an inflatable bag connected about and in communication with said manifold means; and connecting means to connect said generator means, said manifold means and said inflatable gas bag together and solely to the spokes of the steering wheel of said vehicle, said connecting means comprising (1) a bag retainer disposed below said inflatable bag and above said gas generator means, the lower edge portion of said inflatable bag being entrapped between said bag retainer and said diffuser, said retainer being provided with a plurality of arms extending to each of the spokes of said steering wheel, (2) first fastener means to fasten together said manifold means and being adapted to extend through said diffuser, said inflatable gas bag, said retainer and said gas generator means and (3) second fastener means connecting each of said arms of said bag retainer to each of said spokes of said steering wheel.

4. A safety assembly disposed on the steering wheel of a vehicle comprising:

a pyrotechnic gas generator means as sole source of inflating gas, said gas generator means being located centrally of the steering wheel of said vehicle and spaced upwardly from the hub thereof;

a manifold means connected to and communicating with the outlet of said gas generator means, said manifold means including a diffuser disposed above and parallel to said gas generator means and communicating therewith through a conduit;

an inflatable gas bag disposed about and in communication with said diffuser; and a gas bag retainer, provided with a plurality of arms, connected at one end to said diffuser and said gas generator means and at the other end, by each of its arms, solely to each of the spokes of said steering wheel, whereby said gas generator, diffuser and manifold means are connected together and solely to said steering wheel.

5. An assembly, in accordance with claim 4, wherein said pyrotechnic gas generator means comprises:

a combustible material disposed in a combustion compartment;

an ignition means disposed upstream of, and in communication with, said combustible material to ignite said combustible material; and an outlet means disposed downstream of, and in communication with, said combustion chamber.

6. An assembly in accordance with claim 5 wherein said outlet means includes pressure sensitive means responsive to the pressure in said combustion chamber whereby said product gas resulting from the combustion of said combustible material exits into said conduit, in communication with said diffuser, at a predetermined pressure level.

7. An assembly in accordance with claim 4 wherein said diffuser comprises:

an outer housing provided with a plurality of holes;
an inner housing provided with a plurality of holes;
at least one spacer, separating said inner and outer housings and defining a hollow chamber; and
fastener means connecting said inner and outer housings together.

* * * * *

UNITED STATES PATENT OFFICE
CERTIFICATE OF CORRECTION

PATENT NO. : 3,895,823
DATED : July 22, 1975
INVENTOR(S) : Robert L. Stephenson

It is certified that error appears in the above-identified patent and that said Letters Patent are hereby corrected as shown below:

Claim 7, Column 6, Line 27 delete "provided with a plurality of holes".

Signed and Sealed this thirtieth Day of September 1975

[SEAL]

Attest:

RUTH C. MASON
Attesting Officer

C. MARSHALL DANN
Commissioner of Patents and Trademarks